March 14, 1939. R. DAHLSTRÖM ET AL 2,150,493
DEVICE FOR DISINTEGRATING TOBACCO LEAVES
Filed Oct. 26, 1936
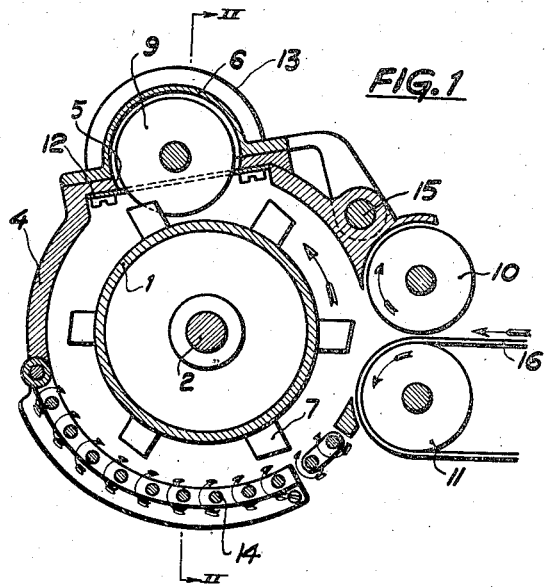
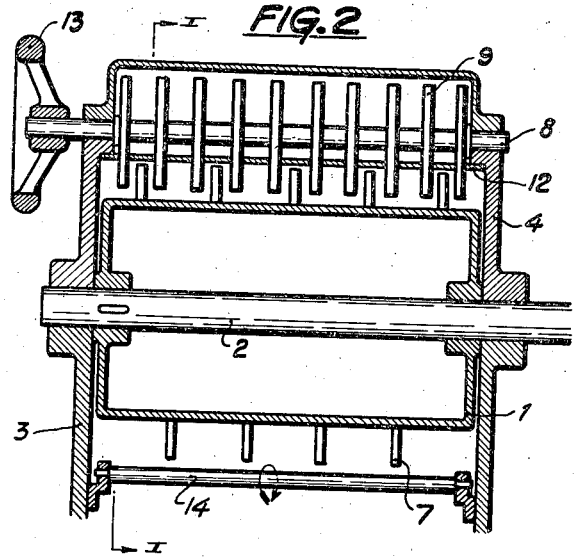
Inventors
Ruben Dahlström
Bertil Rothelius
By Sommers & Young Attys Patented Mar. 14, 1939

2,150,493

UNITED STATES PATENT OFFICE 2,150,493

DEVICE FOR DISINTEGRATING TOBACCO LEAVES

Ruben Dahlström, Alsten, and Bertil Rothelius, Stockholm, Sweden, assignors to Aktiebolaget Formator, Stockholm, Sweden, a joint-stock company of Sweden Application October 26, 1936, Serial No. 107,675
In Sweden October 25, 1935

7 Claims. (Cl. 131—60)

(Granted under the provisions of sec. 14, act of March 2, 1927; 357 O. G. 5)

This invention relates to a device for disintegrating tobacco leaves, and more particularly to such a device having a toothed, rotatable leaf breaker member the teeth of which coact with outer disintegrating members.

In the operation of devices of such kind the teeth of the breaker pass between stationary outer teeth, whereby the leaves are disintegrated into stem and leaf parts. The soft leaf parts are likely to embrace and adhere to the outer teeth, so that the clearance between the teeth and their cutting efficiency will decrease and the desired size of leaf parts and cutting capacity of the device will not be obtained. This will necessitate repeated interruptions of the operation of the device for dismantling same and cleaning the outer teeth.

It is a main object of the invention to remove such drawbacks.

Further objects of the invention will appear from the following description when read in connection with the accompanying drawings showing an illustrative embodiment of the invention and wherein:

Fig. 1 is a cross sectional view of the device on the line I—I of Fig. 2, and

Fig. 2 is a longitudinal sectional view of the same device on the line II—II of Fig. 1.

Referring to the drawing, a breaker cylinder 1 is secured to a driving shaft 2 which is rotatably journalled in the frame 3. The breaker cylinder is covered by a casing 4 upon the upper opening 5 of which is applied another casing 6. The casing 4 can be swung up about a pin 15. The mantle of the breaker cylinder 1 is provided with outwardly directed teeth 7. In the casing 6 is rotatably journalled a shaft 8 provided with disintegrating members in the shape of discs 9 between which the teeth 7 pass when the breaker cylinder rotates. Thereby, tobacco leaves are disintegrated, which are supplied from the outside on a band 16 between the rollers 10 and 11. The tobacco leaves and leaf parts are thereby moved around in the direction of the arrow shown in Fig. 1 and broken against the discs 9, whereafter they are discharged from the disintegrating chamber through a grating, consisting of loosely journalled rod shaped rollers 14 and described and claimed in our copending application Serial No. 107,674 filed October 26, 1936. By replacing the hitherto usual, inwardly directed teeth by round discs according to the invention the risk that leaf parts stick to such disintegrating members is decreased, but even if this should happen, e. g. because of heavy pressing of tobacco juice out of the tobacco mass, this inconvenience is removed thereby that the discs are mounted to coact with scraping means. A scraper plate 12 is secured within the casing 4 and across the upper opening thereof and provided with slots, in which the discs 9 fit rather closely. Moreover, a hand wheel 13 is secured to the outer end of the shaft 8. If a coating is formed on the discs 9 and leaf parts adhere to the same, the leaf parts and coating can easily be removed by turning the wheel 13, whereby the coating etc. is scraped off the discs by the edges of the slots of the plate 12. Of course, this cleaning can be effected without interrupting the operation. Thus the disintegration can continue during the cleaning of the disintegrating members. To this end, in the embodiment according to Figs. 1 and 2, the shaft 8, e. g., may be driven continuously or stepwise by means of the driving mechanism of the disintegrating device.

We claim:

1. In a device for disintegrating tobacco leaves, a rotatable breaker member, a plurality of rotatable discs beyond said breaker member, and outwardly projecting teeth arranged on said breaker member to pass in spaced relationship between said discs, said discs having a substantially cylindrical peripheral surface.

2. In a device for disintegrating tobacco leaves, a rotatable breaker member, disintegrating members beyond said breaker member, outwardly projecting teeth arranged on said breaker member to pass in spaced relationship between said disintegrating members, means having scraping edges in close proximity to said disintegrating members, and means for relatively moving said disintegrating members and said scraping means to remove matter adhering to said disintegrating members, said disintegrating members having front surfaces disposed close to the breaker member for engaging tobacco leaf parts and stems moved by said teeth, said surfaces being inclined inwardly and in the rotary direction of said breaker member.

3. In a device for disintegrating tobacco leaves, a rotatable breaker member, disintegrating members beyond said breaker member, outwardly projecting teeth arranged on said breaker member to pass in spaced relationship between said disintegrating members, said disintegrating members having front surfaces disposed close to the breaker member for engaging tobacco leaf parts and stems moved by said teeth, said surfaces being inclined inwardly and in the rotary direction of said breaker member, means having scraping edges in close proximity to said front surfaces, and means for relatively moving said disintegrating members and said scraping means to remove matter adhering to said front surfaces.

4. In a device for disintegrating tobacco leaves, a rotatable breaker member, disintegrating members beyond said breaker member, outwardly projecting teeth arranged on said breaker member to pass in spaced relationship between said disintegrating members, and means having scraping edges in close proximity of said disintegrating members, said disintegrating members having a movable, substantially cylindrically shaped front surface adapted to engage tobacco leaf parts and stems moved by said teeth.

5. In a device for disintegrating tobacco leaves, a rotatable breaker member, disintegrating members beyond said breaker member, outwardly projecting teeth arranged on said breaker member to pass in spaced relationship between said disintegrating members, said disintegrating members having a movable, substantially cylindrically shaped front surface adapted to engage tobacco leaf parts and stems moved by said teeth, and means having scraping edges in close proximity of said substantially cylindrical surface.

6. In a device for disintegrating tobacco leaves, a rotatable breaker member, a plurality of rotatable discs beyond said breaker member, outwardly projecting teeth arranged on said breaker member to pass in spaced relationship between said discs, means having scraping edges in close proximity of said discs, and means for rotating said discs to remove matter adhering to them, said discs having a substantially cylindrical peripheral surface.

7. In a device for disintegrating tobacco leaves, a rotatable breaker member, a plurality of rotatable discs beyond said breaker member, outwardly projecting teeth arranged on said breaker member to pass in spaced relationship between said discs, means having scraping edges, and means for rotating said discs, said discs having a substantially cylindrical peripheral surface that is movable in close proximity of said scraping means to remove matter adhering to said surface.

RUBEN DAHLSTRÖM.
BERTIL ROTHELIUS.